(12) United States Patent
Hashimoto et al.

(10) Patent No.: US 8,281,837 B2
(45) Date of Patent: Oct. 9, 2012

(54) PNEUMATIC TIRE AND METHOD OF MANUFACTURING THE SAME

(75) Inventors: Yoshimasa Hashimoto, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 510 days.

(21) Appl. No.: 12/414,344

(22) Filed: Mar. 30, 2009

(65) Prior Publication Data

US 2009/0283194 A1 Nov. 19, 2009

(30) Foreign Application Priority Data

May 19, 2008 (JP) ................................. 2008-131385

(51) Int. Cl.
*B60C 9/14* (2006.01)
(52) U.S. Cl. ......... 152/533; 152/526; 152/527; 156/123
(58) Field of Classification Search .................. 152/533, 152/526, 527; 156/123
See application file for complete search history.

(56) References Cited

U.S. PATENT DOCUMENTS

| | | | |
|---|---|---|---|
| 2001/0018492 A1* | 8/2001 | Watanabe et al. ............. | 525/178 |
| 2006/0081319 A1* | 4/2006 | Fukutani et al. .............. | 152/451 |
| 2007/0031661 A1* | 2/2007 | Kanenari ................ | 428/355 BL |

FOREIGN PATENT DOCUMENTS

| | | | |
|---|---|---|---|
| JP | 08-217923 | * | 8/1996 |
| JP | A 8-217923 | | 8/1996 |
| JP | A 11-199713 | | 7/1999 |

* cited by examiner

Primary Examiner — Khanh P Nguyen
Assistant Examiner — Vishal I Patel
(74) Attorney, Agent, or Firm — Greer, Burns & Crain, Ltd.

(57) ABSTRACT

Provided are a pneumatic tire with a durability which is improved by preventing oxygen deterioration of coating rubber of a reinforcement layer, and a method of manufacturing the pneumatic tire. The pneumatic tire according to the present invention is a pneumatic tire including a reinforcement layer having reinforcement cords. In the pneumatic tire, the reinforcement layer is covered with thin films each made of a thermoplastic resin or a thermoplastic elastomer composition obtained by blending a thermoplastic resin with an elastomer in a way that the reinforcement is wrapped with the thin films. A method of manufacturing the pneumatic tire includes: arranging a thin film made of a thermoplastic resin or a thermoplastic elastomer composition on an outer periphery of a making drum, the thermoplastic elastomer composition being obtained by blending a thermoplastic resin with an elastomer; arranging a reinforcement layer including reinforcement cords on an outer periphery of the thin film; arranging another thin film on an outer periphery of the reinforcement layer; covering the reinforcement layer with these thin films in a way that the reinforcement layer is wrapped with the thin films; making an uncured tire including the reinforcement layer; and curing the uncured tire.

6 Claims, 6 Drawing Sheets

US 8,281,837 B2

PNEUMATIC TIRE AND METHOD OF MANUFACTURING THE SAME

BACKGROUND OF THE INVENTION

1. Field of the Invention

The present invention relates to a pneumatic tire including a reinforcement layer including reinforcement cords and a method of manufacturing the pneumatic tire. More specifically, the present invention relates to a pneumatic tire with an improved durability which is realized by preventing oxygen deterioration of coating rubber of a reinforcement layer, and to a method of manufacturing the pneumatic tire.

2. Description of the Related Art

Generally speaking, a pneumatic tire includes a reinforcement layer, such as a carcass layer or a belt layer, which is made by covering multiple aligned reinforcement cords with coating rubber. The coating rubber of the reinforcement layer tends to deteriorate due to oxygen included in the air permeating the tire. Deterioration of the coating rubber of the reinforcement layer decreases the durability of the tire.

Recently, a proposal has been made in which a thin film is arranged on the inner surface of the tire as an air permeation preventive layer. The thin film is made of a thermoplastic resin or a thermoplastic elastomer composition obtained by blending an elastomer in a thermoplastic resin (see Japanese patent application Kokai publication Nos. Hei. 8-217923 and Hei. 11-199713, for example). The air permeation preventive layer of this type is advantageous for suppressing deterioration of the coating rubber of a reinforcement layer covered with the air permeation preventive layers because the air permeability of the air permeation preventive layer is low.

The deterioration of the coating rubber of the reinforcement layer progresses not only due to oxygen included in the air filled in the tire, but also due to oxygen included in the atmosphere outside the tire. Particularly in a case where the tire is stored with no internal pressure filled therein, the coating rubber of the reinforcement layer deteriorates due to oxygen included in the air entering the inside of the tire from the outer surface thereof. For this reason, there is a demand to prevent the decrease in the tire durability attributed to the oxygen deterioration of the coating rubber of the reinforcement layer.

SUMMARY OF THE INVENTION

An object of the present invention is to provide a pneumatic tire with an improved durability which is realized by preventing oxygen deterioration of coating rubber of a reinforcement layer.

A pneumatic tire according to the present invention made for the purpose of attaining the above object is a pneumatic tire including a reinforcement layer having reinforcement cords. The pneumatic tire is characterized in that the reinforcement layer is covered with thin films each made of a thermoplastic resin or a thermoplastic elastomer composition obtained by blending a thermoplastic resin with an elastomer in a way that the reinforcement layer is wrapped with the thin films.

Meanwhile, a method of manufacturing a pneumatic tire according to the present invention made for the purpose of attaining the above object is characterized by including the steps of: arranging a thin film made of a thermoplastic resin or a thermoplastic elastomer composition on an outer periphery of a making drum, the thermoplastic elastomer composition being obtained by blending a thermoplastic resin with an elastomer; arranging a reinforcement layer including reinforcement cords on an outer periphery of the thin film; arranging another thin film on an outer periphery of the reinforcement layer; covering the reinforcement layer with these thin films in a way that the reinforcement layer is wrapped with the thin films; making an uncured tire including the reinforcement layer; and curing the uncured tire.

For the pneumatic tire including the reinforcement layer including reinforcement cords, the present invention prevents the reinforcement layer from being exposed to oxygen included in the air filled in the tire and oxygen included in the air entering the inside of the tire from the outer surface of the tire. That is because the reinforcement layer is covered with the thin films each made of the thermoplastic resin or the thermoplastic elastomer composition in a way that the reinforcement layer is wrapped with the thin films. This makes it possible to prevent oxygen deterioration of the coating rubber of the reinforcement layer, and accordingly to improve the durability of the pneumatic tire.

In the case of the present invention, when the thin films are each made of the thermoplastic elastomer composition, it is desirable that the volume ratio of the elastomer to the thermoplastic elastomer composition should be 55% to 95%. This makes it possible for each thin film to secure a better elastic modulus as a tire member, and concurrently to exhibit an excellent air permeation preventing performance. Furthermore, it is desirable that each thin film made of the thermoplastic elastomer composition should be 10 µm to 300 µm in thickness. On the other hand, when each thin film is made of the thermoplastic resin, it is desirable that the thin film should be 0.5 µm to 10 µm in thickness.

At least one type selected from the group consisting of a carcass layer, a belt layer, a belt cover layer and a side reinforcement layer may be selected as the reinforcement layer including the reinforcement cords. Moreover, because influence of the oxygen deterioration of the reinforcement layer is evident on the reinforcement cords which are steel cords, it is desired that the above-described configuration should be employed to such reinforcement cords.

DETAILED DESCRIPTION OF THE PREFERRED EMBODIMENTS

Figure 1:
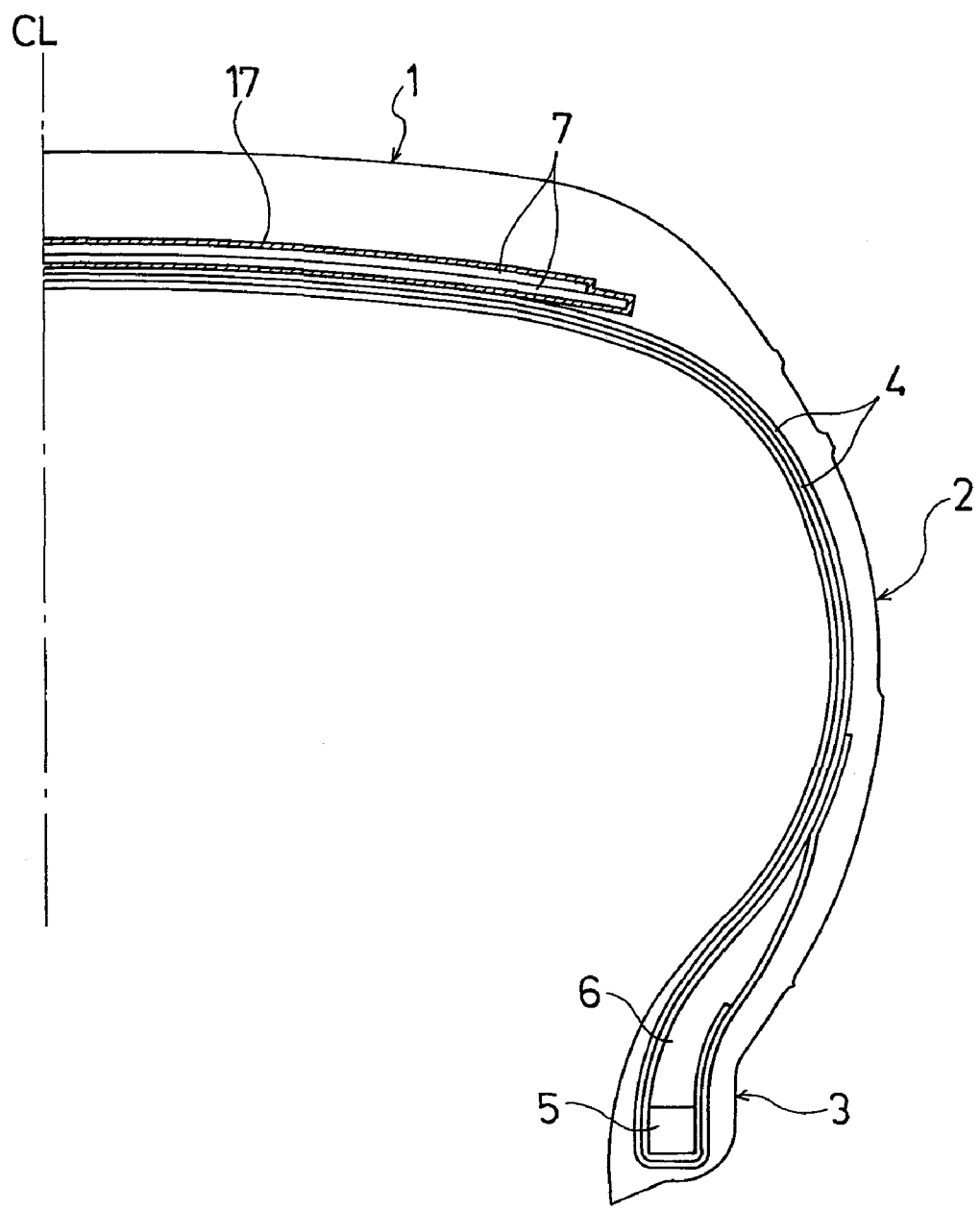
FIG. 1 is a meridian cross-sectional view showing a half of a pneumatic tire according to a first embodiment of the present invention.

Detailed descriptions will be hereinbelow provided for a configuration of the present invention by referring to the attached drawings. FIG. 1 shows a pneumatic tire according to a first embodiment of the present invention. As shown in FIG. 1, a reference numeral 1 denotes a tread part; 2, a sidewall part; and 3, a bead part. Carcass layers 4 each including multiple reinforcement cords are laid between paired right and left bead part 3, 3. The carcass layers 4 are wound up around each bead core 5 from the inside toward the outside of the tire. Generally speaking, organic fiber cords such as nylon cords or polyester cords are used as the reinforcement cords of each carcass layer 4. For a truck tire and a bus tire, however, steel cords may be instead used as the reinforcement cords. A bead filler 6 made of a rubber composition is arranged on the outer periphery of each bead core 5. On the other hand, multiple belt layers 7 are buried at an outer side of the carcass layers 4 in the tread part 1. These belt layers 7 are arranged in a way that reinforcement cords included in each belt layer 7 are inclined relative to the circumferential direction of the tire, and in a way that the reinforcement cords included in one of the belt layers 7 cross over the reinforcement cords included in the other one of the belt layers 7. Generally speaking, steel cords are used as the reinforcement cords of each belt layer 7. Instead, however, organic fiber cords such as aramid cords may be used as the reinforcement cords.

In the above-describe pneumatic tire, the belt layers 7 are covered with thin films 17 each made of a thermoplastic resin or a thermoplastic elastomer composition in a way that the belt layers 7 are together wrapped with the thin films 17. More specifically, the thin films 17 are arranged in a way to interpose the whole belt layers 7 from above and below. Because, in this manner, the belt layers 7 each including the reinforcement cords are together covered with the thin films 17 each made of the thermoplastic resin or the thermoplastic elastomer composition in a way to be wrapped by the thin films 17, it is possible to prevent the belt layers 7 from being exposed to oxygen included in the air filled in the tire and oxygen included in the air entering the inside of the tire from the outer surface thereof. This makes it possible to prevent oxygen deterioration of the coating rubber of each belt layer 7, and accordingly to improve the durability of the pneumatic tire.

Although the foregoing descriptions have been provided for the first embodiment in which the belt layers are covered with the thin films, the present invention makes it possible to form a covering structure in which any other reinforcement layers each including reinforcement cords are covered with the thin films. FIGS. 2 to 5 show pneumatic tires according to the other embodiments of the present invention. In FIGS. 2 to 5, components which are the same as those shown in FIG. 1 will be denoted by the same reference numerals. Detailed descriptions for these parts will be omitted. Here, descriptions will be provided for structures applied to the respective tire members. Nevertheless, it is to be understood that combinations of these structures can be applied to the pneumatic tire of the present invention.

Figure 2:
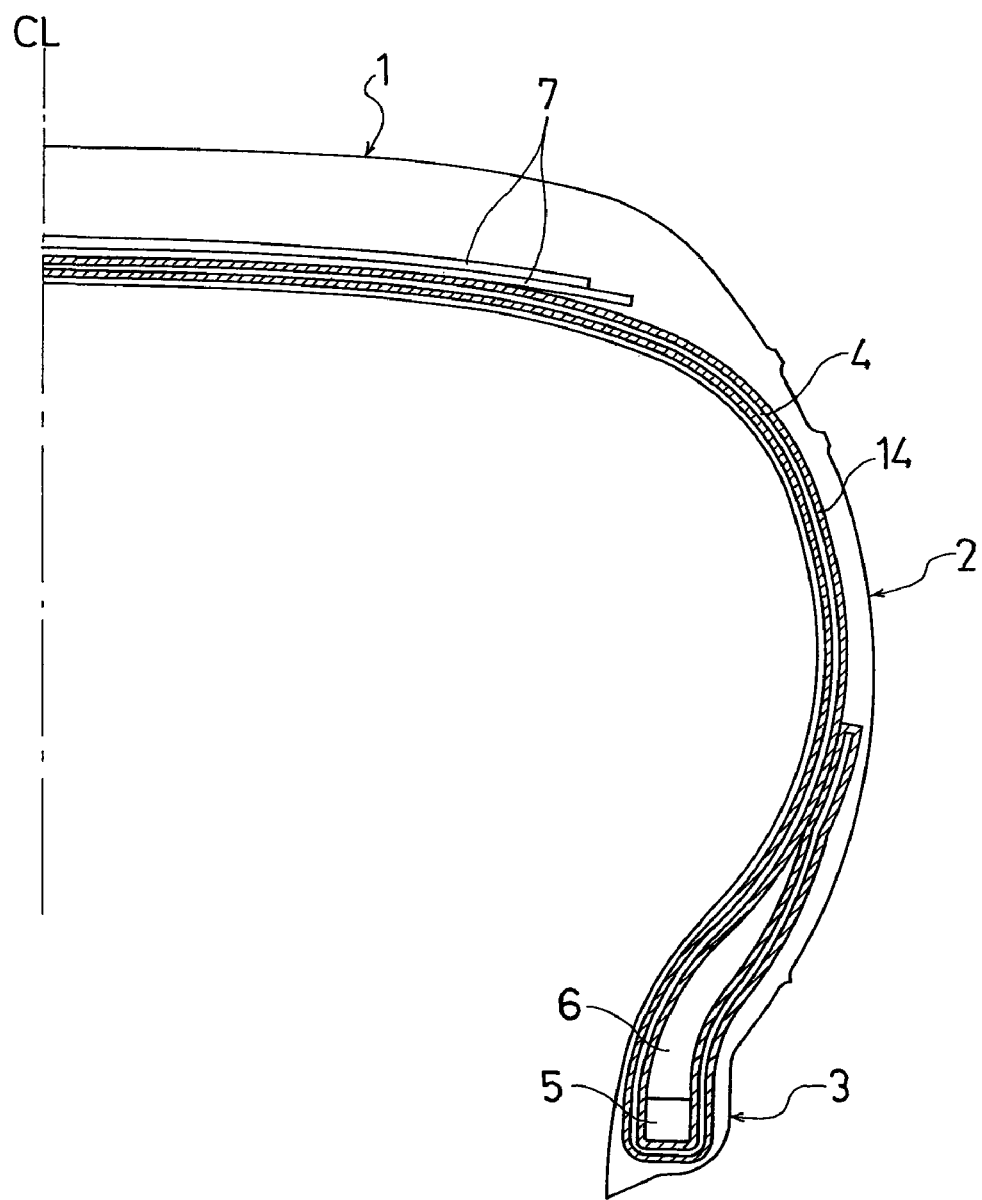
FIG. 2 is a meridian cross-sectional view showing a half of a pneumatic tire according to a second embodiment of the present invention.

In the case of a second embodiment shown in FIG. 2, a covering structure in which a carcass layer is covered with thin films is formed. As shown in FIG. 2, a carcass layer 4 is covered with thin films 14 each made of a thermoplastic resin or a thermoplastic elastomer composition in a way that the carcass layer 4 is wrapped with the thin films 14. More specifically, the thin films 14 are arranged in a way to be in intimate contact respectively with the both entire surfaces of the carcass layer 4.

Figure 3:
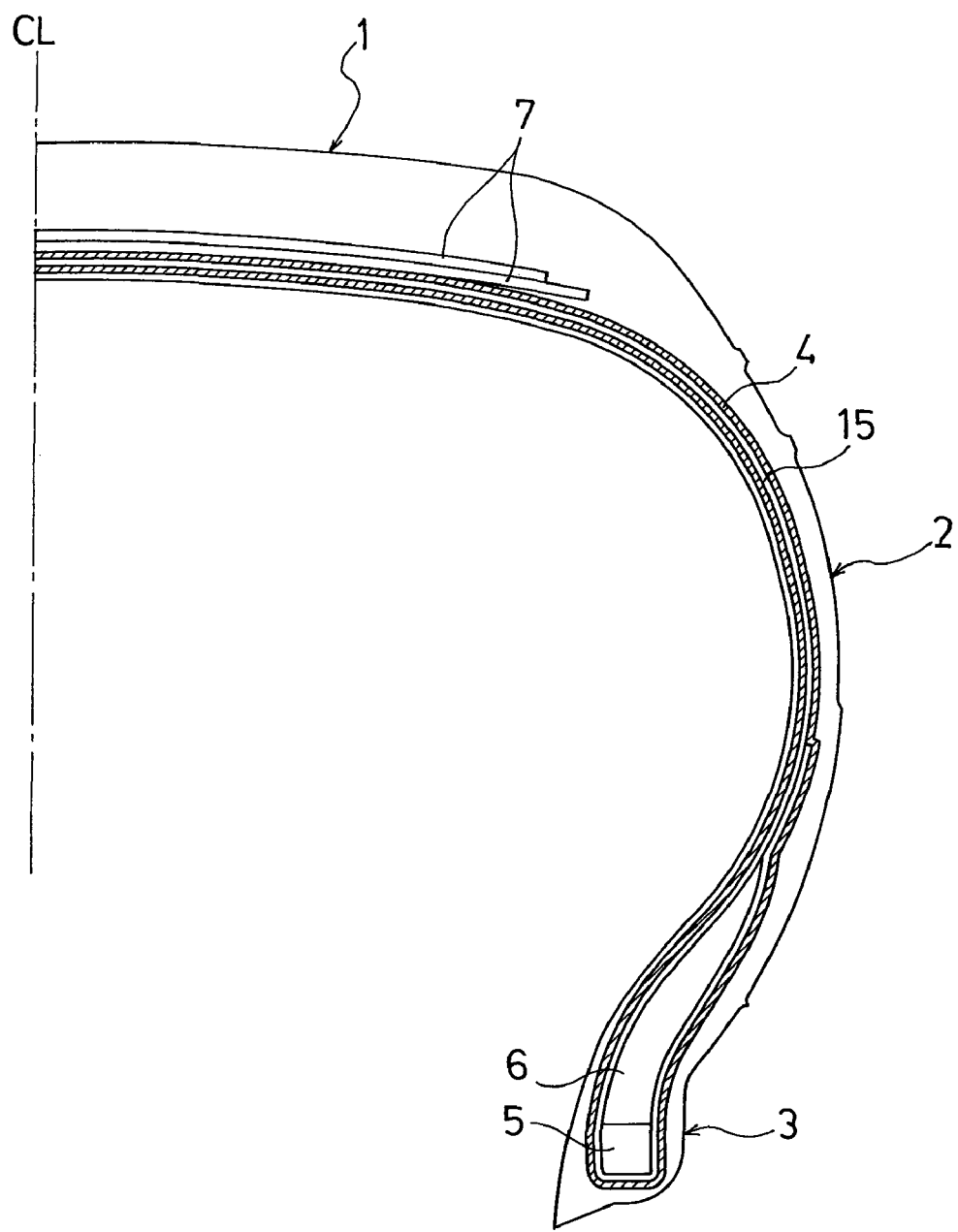
FIG. 3 is a meridian cross-sectional view showing a half of a pneumatic tire according to a third embodiment of the present invention.

In the case of a third embodiment shown in FIG. 3, another covering structure in which a carcass layer is covered with thin films is formed. As shown in FIG. 3, a carcass layer 4 together with each bead core 5 and a corresponding bead filler 6 is covered with thin films 15 each made of a thermoplastic resin or a thermoplastic elastomer composition in a way that the carcass layer 4 together with each bead core 5 and the corresponding bead filler 6 is wrapped with the thin films 15. More specifically, the thin films 15 are arranged in a way that the carcass layer 4 wound up around each bead core 5 is wrapped with the thin films 15.

Figure 4:
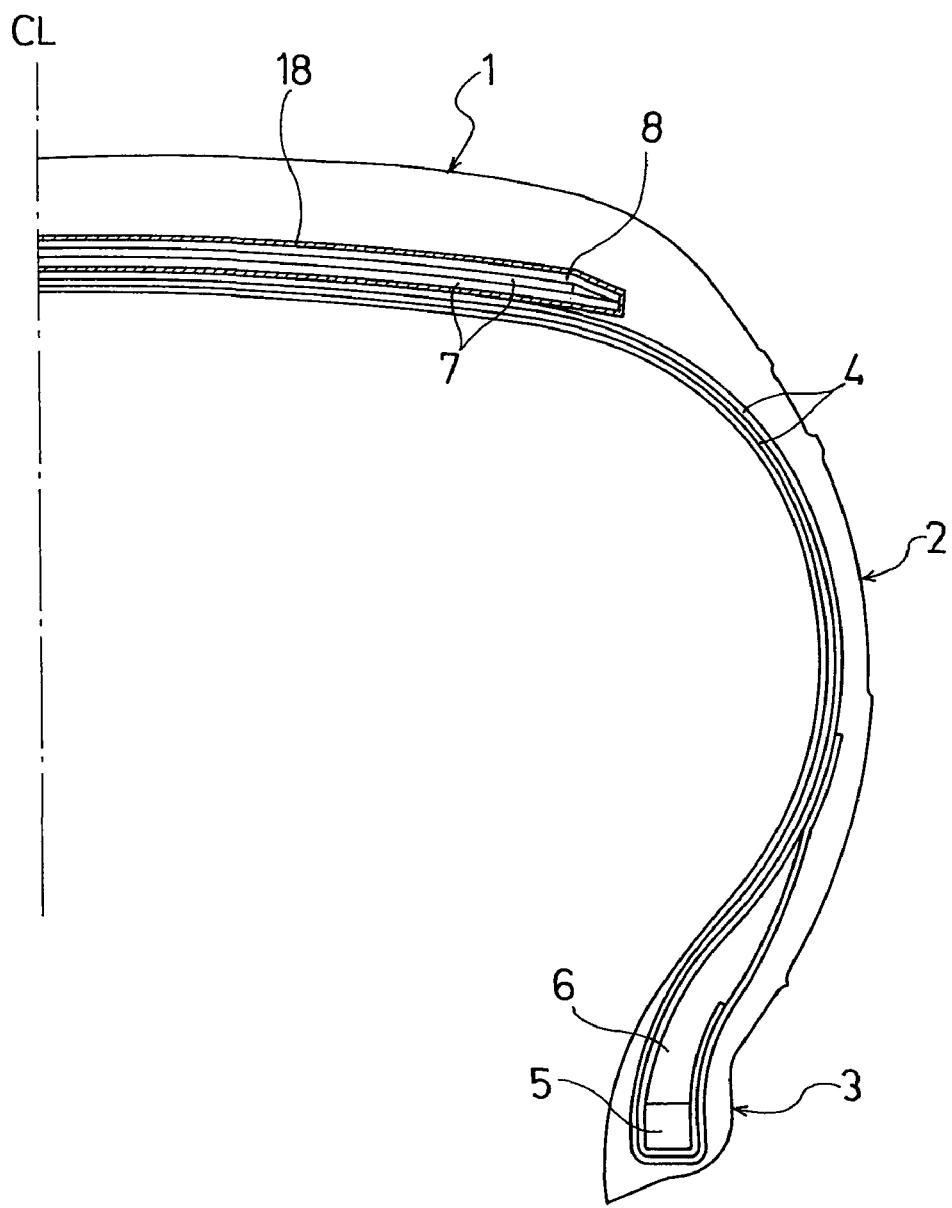
FIG. 4 is a meridian cross-sectional view showing a half of a pneumatic tire according to a fourth embodiment of the present invention.

In the case of a fourth embodiment shown in FIG. 4, yet another covering structure in which a belt cover layer is covered with thin films is formed. As shown in FIG. 4, a belt cover layer 8 including multiple reinforcement cords which are oriented at an angle of substantially 0° to the tire circumferential direction is arranged on the outer periphery of belt layers 7. Generally speaking, organic fiber cords such as nylon cords or polyester cords are used as the reinforcement cords of the belt cover layer 8. This belt cover layer 8 together with the belt layers 7 is covered with thin films 18 each made of a thermoplastic resin or a thermoplastic elastomer composition in a way that the belt cover layer 8 together with the belt layers 7 is wrapped with the thin films 18. More specifically, the thin films 18 are arranged in a way to interpose the belt layers 7 and the belt cover layer 8 from above and below.

Figure 5:
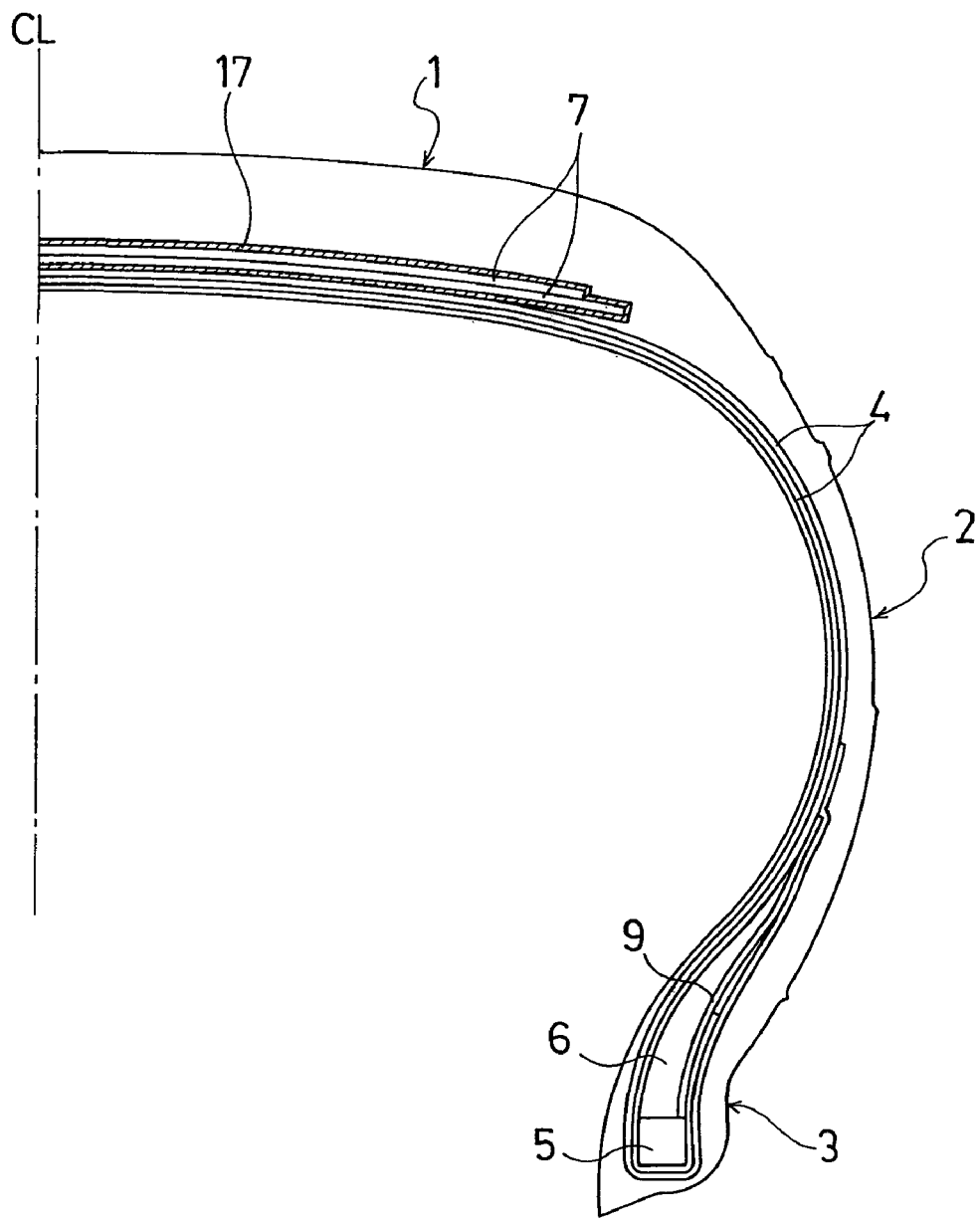
FIG. 5 is a meridian cross-sectional view showing a half of a pneumatic tire according to a fifth embodiment of the present invention.
Figure 6:
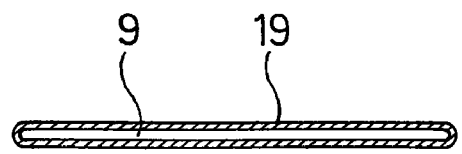
FIG. 6 is a cross-sectional view showing a side reinforcement layer extracted from the pneumatic tire shown in FIG. 5.

In the case of a fifth embodiment shown in FIG. 5, still another covering structure in which a side reinforcement layer is covered with thin films is formed. As shown in FIG. 5, a side reinforcement layer 9 including multiple reinforcement cords which are inclined relative to the tire circumferential direction is arranged in each bead part 3. In addition to steel cords, organic fiber cords such as nylon cords or aramid cords may be used as the reinforcement cords of the side reinforcement layer 9. This side reinforcement layer 9 is covered with a thin films 19 each made of a thermoplastic resin or a thermoplastic elastomer composition in a way that the side reinforcement layer 9 is wrapped with the thin films 19 (see FIG. 6). More specifically, the thin films 19 are arranged in a way to interpose the side reinforcement layer 9 from the right and left thereof.

As described above, each reinforcement layer such as the carcass layer 4, the belt cover layer 8 or the side reinforcement layer 9 is covered with the corresponding thin films each made of a thermoplastic resin or a thermoplastic elastomer composition in a way that the reinforcement layer is wrapped with the corresponding thin film. Accordingly, it is possible to prevent the reinforcement layer from being exposed to oxygen included in the air filled in the tire or oxygen included in the air entering the inside of the tire from the outer surface thereof. This makes it possible to prevent oxygen deterioration of the coating rubber of the reinforcement layer including the reinforcement cords, and accordingly to improve the durability of the pneumatic tire.

In the case where the thin films 14, 15, 17, 18, 19 are each made of the thermoplastic elastomer composition, it is desirable that the volume ratio of the elastomer to the thermoplastic elastomer composition should be 55% to 95%. This makes it possible for the thin films 14, 15, 17, 18, 19 to secure a better elastic modulus as members of the tire, and concurrently to exhibit an excellent air permeation preventing performance. In this respect, if the volume ratio of the elastomer to the thermoplastic elastomer composition is less than 55%, the elastic modulus of each thin film is too high. This makes it difficult to use such thin films as the members of the tire. On the contrary, if the volume ratio thereof exceeds 95%, the air permeation preventing performance exhibited by each thin film decreases.

In the case where the thin films 14, 15, 17, 18, 19 are each made of a thermoplastic elastomer composition, it is desirable that each thin film should be 10 µm to 300 µm in thickness. If their thickness is less than 10 μm, their air permeation preventing performance decreases. On the contrary, if their thickness exceeds 300 μm, their rigidity is too high. This makes it difficult to use the thin films 14, 15, 17, 18, 19 as the members of the tire. Meanwhile, in the case where the thin films 14, 15, 17, 18, 19 are each made of a thermoplastic resin, it is desirable that each thin film should be 0.5 μm to 10 μm in thickness. If their thickness is less than 0.5 μm, their air permeation preventing performance decreases. On the contrary, if the thickness exceeds 10 μm, their rigidity is too high. This makes it difficult to use the thin films 14, 15, 17, 18, 19 as the members of the tire.

Next, descriptions will be provided for a method of manufacturing the foregoing pneumatic tire. In a case where the pneumatic tire is manufactured, a thin film made of a thermoplastic resin or a thermoplastic elastomer composition is arranged on the outer periphery of a making drum; subsequently, a reinforcement layer including reinforcement cords is arranged on the outer periphery of the thin film; thereafter, another thin film is arranged on the outer periphery of the reinforcement layer; afterward, the reinforcement layer is covered with these thin films in a way that the reinforcement layer is wrapped with the thin films; after that, an uncured tire including the reinforcement layer is formed; and subsequently, the uncured tire is cured.

Figure 7:
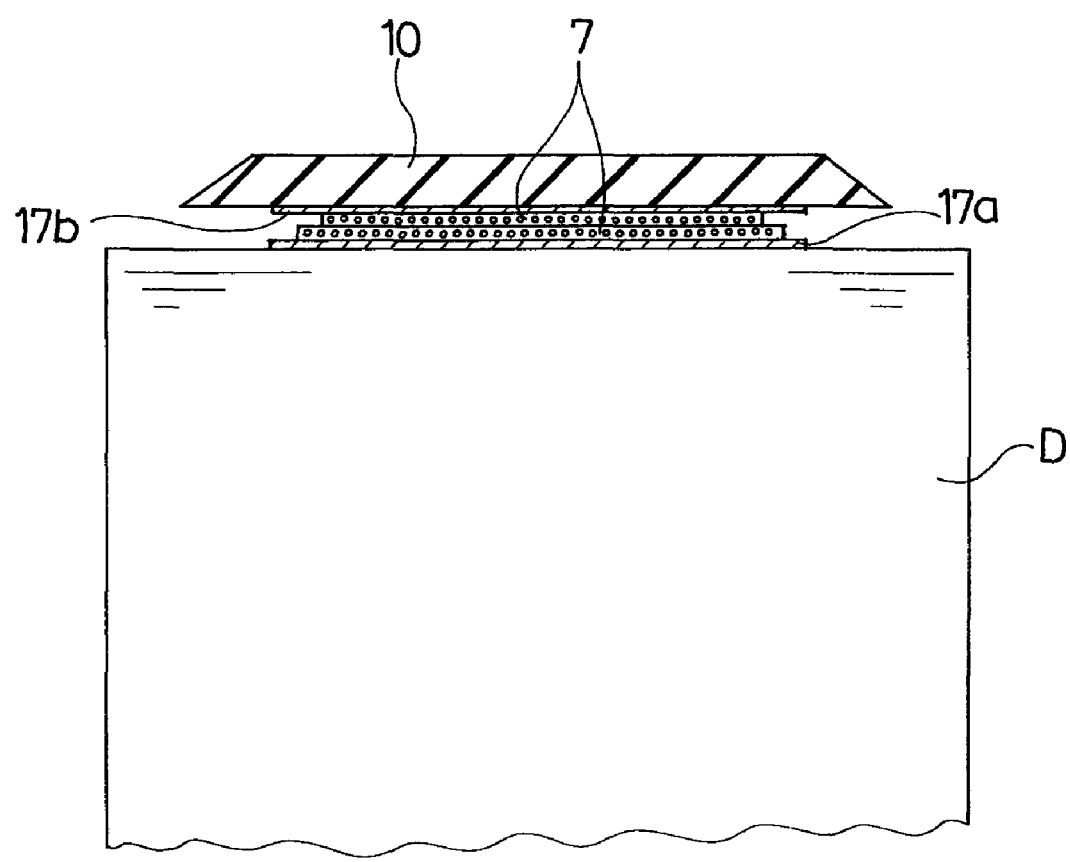
FIG. 7 is a cross-sectional view showing main manufacturing steps of forming a covering structure in which belt layers are covered with thin films.

FIG. 7 shows main steps of the tire manufacturing method for forming a covering structure in which belt layers are covered with thin films. As shown in FIG. 7, first of all, a thin film 17a made of a thermoplastic resin or a thermoplastic elastomer composition is arranged on the outer periphery of a making drum D, and subsequently, two belt layers 7 are wound around the outer periphery of the thin film 17a. Thereafter, another thin film 17b is arranged on the outer periphery of the belt layers 7. Afterward, the belt layers 7 are covered with these thin films 17a, 17b in a way that the belt layers 7 are together wrapped with the thin films 17a, 17b. After that, a cap tread layer 10 is wound around the outer periphery of a laminated body including the belt layers 7 and the thin films 17a, 17b so as to form a belt/tread laminated body is formed. Subsequently, the belt/tread laminated body thus obtained is adhered to a first green tire formed in a different manufacturing step so that an uncured tire including the belt layers 7 is formed. Thereafter, the uncured tire is cured. Thereby, the desired pneumatic tire can be obtained.

In the foregoing manufacturing steps, it is possible: to form the thin films having wider widths than the belt width by continuously winding a strip-shaped thin film in the tire circumferential direction; to wind sheet-shaped thin films having wider widths than the belt width in the tire circumferential direction; or to cover around the making drum with cylinder-shaped thin films. From a viewpoint of increasing the uniformity of the tire, it is desirable that the cylinder-shaped thin films should be employed.

Descriptions will be hereinbelow provided for the thin films used for the present invention. These thin films can be each made of a thermoplastic resin or a thermoplastic elastomer composition obtained by blending a thermoplastic resin with an elastomer.

Examples of the thermoplastic resin preferably used in the present invention include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers); their N-alkoxyalkylated products (for example, methoxymethylated nylon 6, methoxymethylated nylon 6/610 copolymers, and methoxymethylated nylon 612); polyester resins (for example, aromatic polyesters, such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); polymethacrylate resins (for example, polymethyl methacrylate (PMMA), polyethyl methacrylate); polyvinyl resins (for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene (ETFE) copolymers); and imide resins (for example, aromatic polyimide (PI)).

Examples of the elastomer preferably used in the present invention include: diene rubbers and their hydrogenated products (for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR); olefin rubbers (for example, ethylene propylene rubbers (EPDM and EPM), maleic acid-modified ethylene/alfa-olefin copolymerized rubber, maleic acid-modified ethylene propylene rubber (M-EPM), butyl rubber (IIR), copolymers of isobutylene and aromatic vinyl or diene monomer, acrylic rubber (ACM), and ionomers); halogen-containing rubbers (for example, Br-IIR, Cl-IIR, brominated isobutylene-p-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)); silicone rubbers (for example, methyl vinyl silicone rubber, dimethyl silicone rubber, and methylphenylvinyl silicone rubber); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (for example, styrene elastomers, olefin elastomers, ester elastomers, urethane elastomers, and polyamide elastomers).

If a particular thermoplastic resin among those described above is incompatible with such an elastomer, a compatibilizer may be used as a third component appropriately to make the two compatible with each other. By mixing such a compatibilizer into the blend system, the interfacial tension between the thermoplastic resin and the elastomer is reduced. As a result, the rubber particles constituting the dispersion phase is made finer, so that both components can exhibit their characteristics more effectively. In general, such a compatibilizer has a copolymer structure of at least one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. The compatibilizer can be selected depending on the type of the thermoplastic resin and the elastomer to be mixed therewith. What is normally used is styrene/ethylene-butylene-styrene block copolymers (SEBS) and their maleic acid-modified products, EPDM, EPM, EPDM/styrene or EPDM/acrylonitrile graft copolymers and their maleic acid-modified products, styrene/maleic acid copolymers, reactive phenoxine, and the like. The blending proportion of such a compatibilizer is not particularly limited, but may preferably be 0.5 to 10 parts by weight relative to 100 parts by weight of the polymer components (the total amount of the thermoplastic resin and the elastomer).

In the thermoplastic elastomer composition, the component ratio of a particular thermoplastic resin to a particular elastomer is not particularly limited, and may be appropriately set so as to have a structure in which the elastomer is dispersed as a discontinuous phase in a matrix of the thermoplastic resin. However, the preferable range is 90/10 to 30/70 in weight ratio.

In the present invention, the thermoplastic resin and the thermoplastic elastomer composition each of which constitutes the film may be mixed with another polymer, for example, the above-described compatibilizer in such an amount that the polymer does not harm the characteristic required as the members of the tire. The purposes of mixing such a polymer are to improve the compatibility between the thermoplastic resin and the elastomer, to improve the molding processability of the material for the film, to improve the heat resistance, to reduce cost, and so on. Examples of the material used for the polymer include polyethylene (PE), polypropylene (PP), polystyrene (PS), ABS, SBS, and polycarbonate (PC). In addition, a filler (calcium carbonate, titanium oxide, alumina, or the like) generally blended with a polymer blend, a reinforcement such carbon black and white carbon, a softner, a plasticizer, a processing aid, a pigment, a dye, an anti-degradant, or the like can be blended optionally as long as such an agent does not harm the characteristic required as the members of the tire.

When mixed with the thermoplastic resin, the elastomer can be dynamically vulcanized. A vulcanizer, a vulcanization assistant, vulcanization conditions (temperature, time), and the like, during the dynamic vulcanization can be determined as appropriate in accordance with the composition of the elastomer to be added, and are not particularly limited.

As the vulcanizer, a generally-available rubber vulcanizer (crosslinking agent) can be used. Specifically, examples of a sulfur-based vulcanizer include a sulfur powder, precipitated sulfur, highly dispersible sulfur, surface-treated sulfur, non-soluble sulfur, dimorpholin disulfide, and alkylphenol disulfide. Such a vulcanizer can be used in an amount of, for example, approximately 0.5 to 4 phr (hereinafter, "phr" refers to parts by weight per 100 parts by weight of the elastomer component).

Moreover, examples of an organic peroxide-based vulcanizer include benzoyl peroxide, t-butyl hydroperoxide, 2,4-dichlorobenzoyl peroxide, 2,5-dimethyl-2,5-di(t-butyl peroxy)hexane, and 2,5-dimethylhexane-2,5-di(peroxyl benzoate). Such an organic peroxide-based vulcanizer can be used in an amount of, for example, approximately 1 to 20 phr.

Furthermore, examples of a phenol resin-based vulcanizer includes brominated alkylphenol resins and mixed crosslinking system containing an alkyl phenol resin with a halogen donor such as tin chloride and chloroprene. Such a phenol resin-based vulcanizer can be used in an amount of, for example, approximately 1 to 20 phr.

Examples of other vulcanizers include zinc white (approximately 5 phr), magnesium oxide (approximately 4 phr), litharge (approximately 10 to 20 phr), p-quinone dioxime, p-dibenzoylquinone dioxime, tetrachloro-p-benzoquinone, poly-p-dinitrosobenzene (approximately 2 to 10 phr), and methylenedianiline (approximately 0.2 to 10 phr).

As necessary, a vulcanization accelerator may be added. Examples of the vulcanization accelerator are aldehyde-ammonia-based, guanidine-based, thiazole-based, sulfenamide-based, thiuram-based, dithioic acid salt-based, and thiourea-based vulcanization accelerators which are generally available. Such a vulcanization accelerator can be used in an amount of, for example, approximately 0.5 to 2 phr.

Specifically, an example of the aldehyde-ammonia-based vulcanization accelerator includes hexamethylenetetramine. An example of the guanidine-based vulcanization accelerator includes diphenylguanidine. Examples of the thiazole-based vulcanization accelerator include dibenzothiazyl disulfide (DM), 2-mercapto benzothiazole and their Zn salts, and cyclohexylamine salts. Examples of the sulfenamide-based vulcanization accelerator include cyclohexylbenzothiazyl sulfenamide (CBS), N-oxydiethylenebenzothiazyl-2-sulfenamide, N-t-butyl-2-benzothiazole sulfenamide, and 2-(thymolpolynyldithio)benzothiazole. Examples of the thiuram-based vulcanization accelerator include tetramethylthiuram disulfide (TMTD), tetraethylthiuram disulfide, tetramethylthiuram monosulfide (TMTM), and dipentamethylenethiuram tetrasulfide. Examples of the dithioic acid salt-based vulcanization accelerator include Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, and pipecoline pipecolyldithiocarbamate. Examples of the thiourea-based vulcanization accelerator include ethylene thiourea and diethylthiourea.

Additionally, a vulcanization accelerator assistant which is generally-used for a rubber can be used. For example, zinc white (approximately 5 phr), stearic acid, oleic acid and their Zn salts (approximately 2 to 4 phr), or the like can be used.

The method for producing the thermoplastic elastomer composition is as follows. The thermoplastic resin and the elastomer (unvulcanized one in the case of rubber) are melt-kneaded in advance by a bi-axial kneader/extruder or the like. The elastomer is dispersed as a dispersion phase (domain) in the thermoplastic resin forming a continuous phase (matrix). When the elastomer is vulcanized, the vulcanizer can be added during the kneading process to dynamically vulcanize the elastomer. Although the various compounding agents (except for vulcanizer) may be added to the thermoplastic resin or the elastomer during the kneading process, it is preferable to premix the compounding agents before the kneading process. The kneader used for kneading the thermoplastic resin and the elastomer is not particularly limited. A screw extruder, kneader, Banbury Mixer, bi-axial kneader/extruder, or the like can be used as the kneader. Among these, a bi-axial kneader/extruder is preferably used for kneading the thermoplastic resin and the elastomer and for dynamically vulcanizing the elastomer. Furthermore, two or more types of kneaders can be used to successively knead the thermoplastic resin and the elastomer. As the condition for the melt kneading, the temperature should be at a temperature at which the thermoplastic resin melts or at a higher temperature. The shear rate at the time of kneading is preferably 1000 to 7500 $sec^{-1}$. The overall kneading time is 30 seconds to 10 minutes. When the vulcanizer is added, the vulcanization time after the addition is preferably 15 seconds to 5 minutes. The polymer composition produced by the above method may be formed into a desired shape by a generally-used method for forming a thermoplastic resin such as injection molding and extrusion molding.

The thermoplastic elastomer composition thus obtained has a structure in which the elastomer is dispersed as a discontinuous phase in the matrix of the thermoplastic resin. By adopting such a structure, it becomes possible to provide the members of the tire with both sufficient flexibility and sufficient stiffness that is attributed to the effect of the resin layer as the continuous phase. Furthermore, it becomes possible to obtain, in molding, a molding processability equivalent to the case of a thermoplastic resin regardless of the amount of elastomer.

The Young's moduli of the thermoplastic resin and the thermoplastic elastomer composition are not particularly limited, but are preferably set to 1 to 1500 MPa, and more preferably 50 to 700 MPa.

The thermoplastic resin or the thermoplastic elastomer composition can be formed into a sheet or film to be used as a single unit. Alternatively, an adhesive layer may be stacked thereon in order to improve the adhesiveness to the adjacent rubber. Specific examples of an adhesive polymer that constitutes the adhesive layer include an ultra high molecular weight polyethylene (UHMWPE) having a molecular weight of 1,000,000 or more, preferably 3,000,000 or more, acrylate copolymers such as ethylene-ethylacrylate copolymers (EEA), ethylene-methylacrylate resins (EMA) and ethylene-acrylic acid copolymers (EAA), and their maleic anhydrate adduct, polypropylene (PP) and maleic acid-modified products thereof, ethylene-polypropylene copolymers and maleic acid-modified products thereof, polybutadiene resins and maleic anhydrate-modified products thereof, styrene-butadiene-styrene copolymers (SBS), styrene-ethylene-butadiene-styrene copolymers (SEBS), thermoplastic fluororesins, and thermoplastic polyester resins. These polymers can be formed into a sheet or film by being extruded with, for example, a resin extruder in accordance with a generally-used method. The thickness of the adhesive layer is not particularly limited, but is preferably small for the tire weight reduction. The thickness of 5 μm to 150 μm is preferable.

Hereinabove, the preferable embodiment of the present invention has been described in detail. It should be understood, however, that various alternations, substitutions and replacements can be made on the above-described embodiment without departing from the spirit and scope of the present invention defined by the attached claims.

EXAMPLES

As Conventional Example, Examples 1 and 2 as well as Comparative Examples 1 and 2, pneumatic tires each with a tire size of 195/65R15 were produced by laying carcass layers between paired bead parts, and subsequently by arranging belt layers on the outer peripheral one of the carcass layers, but by making a configuration of a belt portion different from one to another.

The tire of Conventional Example included no covering structure in which the belt layers were covered with the thin films. In the case of the tire of Example 1, the belt layers were covered with 50 μm-thick thin films in a way that the belt layers were wrapped from the both surfaces by the thin films. Each of the thin films was made of a thermoplastic elastomer composition obtained by blending nylon 6/66 copolymer (Amiran CM-6001® manufactured by Toray Industries, Inc.) as a thermoplastic resin, with a bromine compound (MDX90-10® manufactured by Exxon Mobil Chemical Company) of isobutylene-paramethyl styrene copolymer as an elastomer, with a weight ratio of 40:60. In the case of the tire of Example 2, the belt layers were covered with 5 μm-thick thin films in a way that the belt layers were wrapped from both surfaces by the thin films. Each of the thin films was made of nylon 6/66 copolymer (Amiran CM-6001® manufactured by Toray Industries, Inc.) as a thermoplastic resin. In the case of the tire of Comparative Example 1, a 50 μm-thick thin film made of the same thermoplastic elastomer composition as in the case of Example 1 was laid only on the inner surface of the inner peripheral one of the belt layers. In the case of the tire of Comparative Example 2, a 50 μm-thick thin film made of the same thermoplastic elastomer composition as in the case of Example 2 was laid only on the outer surface of the outer peripheral one of the belt layers.

For each of the tires of Comparative Example, Examples 1 and 2 as well as Comparative Examples 1 and 2, the durability was evaluated in accordance with the following evaluation method. Table 1 shows the results of the respective evaluations.

Durability:

Each test tire was mounted on a wheel having a rim size of 15×6J. Subsequently, each tire was filled with oxygen at a pressure of 350 kPa. Thereafter, each consequent tire was left in an environment at 80° C. for five days. Afterward, a high-speed durability test was conducted for each tire while setting the internal pressure thereof at 200 kPa, and the distance each tire traveled until a separation trouble occurred in the corresponding belt layers was measured. The evaluation results were indicated by index while the result of Conventional Example was indexed at 100. Here, a larger index means a better durability.

TABLE 1

|  | CONVENTIONAL EXAMPLE | EXAMPLE 1 | EXAMPLE 2 | COMPARATIVE EXAMPLE 1 | COMPARATIVE EXAMPLE 2 |
| --- | --- | --- | --- | --- | --- |
| MATERIAL FOR THIN FILM | — | THERMOPLASTIC ELASTOMER COMPOSITION | THERMOPLASTIC RESIN | THERMOPLASTIC ELASTOMER COMPOSITION | THERMOPLASTIC ELASTOMER COMPOSITION |
| ARRANGEMENT OF THIN FILM | — | BOTH SURFACES | BOTH SURFACES | INNER SURFACE | OUTER SURFACE |
| THICKNESS OF THIN FILM (μm) | — | 50 | 5 | 50 | 50 |
| DURABILITY (INDEX) | 100 | 110 | 110 | 105 | 104 |

As clearly shown in Table 1, the tires of Examples 1 and 2 were better in durability than the tires of Conventional Example. Meanwhile, the durability of each of the tires of Comparative Examples 1 and 2 was still insufficient although exhibiting some effect of improving the durability.

What is claimed is:

1. A pneumatic tire including a reinforcement layer having reinforcement cords, wherein
   the reinforcement cords of the reinforcement layer are coated in a coating rubber;

thin films are arranged so that the thin films are disposed above and below the reinforcement layer; and the thin films are each made of any one of a thermoplastic resin and a thermoplastic elastomer composition obtained by blending a thermoplastic resin with an elastomer.

2. The pneumatic tire according to claim 1, wherein each thin film is made of the thermoplastic elastomer composition, and a volume ratio of the elastomer to the thermoplastic elastomer composition is 55% to 95%.

3. The pneumatic tire according to claim 1, wherein each thin film is made of the thermoplastic elastomer composition, and is 10µm to 300µm in thickness.

4. The pneumatic tire according to claim 1, wherein each thin film is made of the thermoplastic resin, and is 0.5µm to 10µm in thickness.

5. The pneumatic tire according to any one of claims 1 to 4, wherein the reinforcement layer is of at least one type selected from the group consisting of a carcass layer, a belt layer, a belt cover layer and a side reinforcement layer.

6. The pneumatic tire according to any one of claims 1 to 4, wherein the reinforcement cords are steel cords.

* * * * *